(12) United States Patent
Shah et al.

(10) Patent No.: US 8,793,354 B2
(45) Date of Patent: Jul. 29, 2014

(54) SYSTEM AND METHOD FOR OPTIMIZING MAINTENANCE OF GEOGRAPHICALLY DISTRIBUTED PROCESSING UNITS

(75) Inventors: Krutarth Shah, Fremont, CA (US); Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 2011 days.

(21) Appl. No.: 11/465,740

(22) Filed: Aug. 18, 2006

(65) Prior Publication Data

US 2007/0250620 A1 Oct. 25, 2007

Related U.S. Application Data

(60) Provisional application No. 60/794,016, filed on Apr. 20, 2006.

(51) Int. Cl.
*G06F 15/173* (2006.01)
*H04L 12/24* (2006.01)

(52) U.S. Cl.
CPC ........ *H04L 41/0622* (2013.01); *H04L 41/0663* (2013.01); *H04L 41/24* (2013.01)
USPC ............ 709/223; 709/202; 709/222; 709/241

(58) Field of Classification Search
CPC .. H04L 41/0622; H04L 41/0663; H04L 41/24
USPC ........................................................ 709/224
See application file for complete search history.

(56) References Cited

U.S. PATENT DOCUMENTS

| 4,494,144 | A | 1/1985 | Brown | |
|---|---|---|---|---|
| 5,270,919 | A * | 12/1993 | Blake et al. | 370/400 |
| 5,673,256 | A | 9/1997 | Maine | 370/271 |
| 5,801,756 | A | 9/1998 | Iizawa | |
| 6,014,700 | A | 1/2000 | Bainbridge et al. | |
| 6,182,110 | B1 * | 1/2001 | Barroux | 709/201 |
| 6,606,643 | B1 | 8/2003 | Emens et al. | |
| 6,611,503 | B1 | 8/2003 | Fitzgerald et al. | |
| 6,711,212 | B1 | 3/2004 | Lin | |

(Continued)

FOREIGN PATENT DOCUMENTS

| EP | 1517506 | 3/2005 |
|---|---|---|
| WO | WO 02/060126 | 8/2002 |
| WO | WO 02/076030 | 9/2002 |
| WO | WO 2004/109975 | 12/2004 |

OTHER PUBLICATIONS

Notification of Transmittal of the International Search Report and the Written Opinion of the International Searching Authority, or the Declaration for PCT/US 07/70563 (ISA/US); 6 pages, Feb. 4, 2008.
PCT Notification re PCT/US2008/061714 dated Oct. 17, 2008.

(Continued)

*Primary Examiner* — Michael Y Won
(74) *Attorney, Agent, or Firm* — Baker Botts L.L.P.

(57) ABSTRACT

A system and method are provided for optimizing maintenance of a geographically distributed data processing system. The method comprises selecting a primary territory having associated operating hours, identifying maintenance hours that exclude the operating hours, and selecting a maintenance time within the available maintenance hours. The midpoint of the maintenance hours may be selected as the maintenance time, or activity distribution data may be analyzed to select a maintenance time corresponding to a low activity time.

17 Claims, 2 Drawing Sheets

(56) References Cited

U.S. PATENT DOCUMENTS

| | | | |
|---|---|---|---|
| 6,757,277 B1 | 6/2004 | Shaffer et al. | |
| 6,775,247 B1 | 8/2004 | Shaffer et al. | |
| 6,990,521 B1 | 1/2006 | Ross | 709/224 |
| 6,999,829 B2 | 2/2006 | Bazzocchi et al. | 700/99 |
| 7,054,933 B2 | 5/2006 | Baxley et al. | |
| 7,080,105 B2 | 7/2006 | Nakanishi et al. | 707/204 |
| 7,085,786 B2 | 8/2006 | Carlson et al. | 707/204 |
| 7,103,664 B1 | 9/2006 | Novaes et al. | |
| 7,184,531 B2 | 2/2007 | Crouch | |
| 7,213,050 B1 | 5/2007 | Shaffer et al. | |
| 2001/0002927 A1 | 6/2001 | Detampel, Jr. et al. | |
| 2002/0078153 A1 | 6/2002 | Chung et al. | |
| 2002/0099682 A1 | 7/2002 | Stanton | 707/1 |
| 2002/0165754 A1* | 11/2002 | Tang et al. | 705/9 |
| 2003/0023672 A1 | 1/2003 | Vaysman | |
| 2004/0015409 A1 | 1/2004 | Chittendon et al. | 705/26 |
| 2006/0026212 A1* | 2/2006 | Tsukerman et al. | 707/200 |
| 2006/0041571 A1 | 2/2006 | Kubokawa | 707/101 |
| 2006/0129626 A1 | 6/2006 | Fitzpatrick | 709/200 |
| 2006/0171337 A1 | 8/2006 | Shaffer et al. | |
| 2006/0233120 A1 | 10/2006 | Eshel et al. | |
| 2007/0083521 A1 | 4/2007 | Diedrich et al. | |
| 2007/0299954 A1 | 12/2007 | Fatula | |
| 2008/0266383 A1 | 10/2008 | Shah et al. | |
| 2008/0267282 A1 | 10/2008 | Kalipatnapu et al. | |

OTHER PUBLICATIONS

PCT Notification re PCT/US2008/061120; ISA/EP; 9 pages Aug. 22, 2008.

Communication from European Patent Office Application No. 08 746 994.6-1244, 8 pages, dated Jun. 21, 2010 but not received until Jul. 15, 2010.

State IP Office of the People's Republic of China, The First Office Action re Appln. 200880014055.0, Serial No. 2011120600718730 dated Dec. 9, 2011, received on Mar. 22, 2012.

State IP Office of the People's Republic of China, The First Office Action re: Appln. 200880013465.3, dated Dec. 15, 2011, received Apr. 19, 2012.

USPTO Office Action for U.S. Appl. No. 11/796,993, filed Apr. 30, 2007, Shah, et al, Office Action dated Dec. 14, 2011, 15 pages.

USPTO Office Action for U.S. Appl. No. 11/741,088, filed Feb. 27, 2007, Kalipatnapu, et al., Office Action dated Jul. 11, 2011, 14 pages.

USPTO Office Action for U.S. Appl. No. 11/741,088, filed Feb. 27, 2007, Kalipatnapu, et al., final Office Action dated Dec. 7, 2011, 9 pages.

Shah et al., U.S. Appl. No. 11/796,996, filed Apr. 30, 2007. "*Method and System for Identifying a Multipoint Control Unit for Hosting a Conference*", 38 pages.

Kalipatnapu et al., U.S. Appl. No. 11/741,088, filed Apr. 27, 2007, "*Optimizing Bandwidth in a Multipoint Video Conference*" 47 pages.

Notice of Appeal for U.S. Appl. No. 11/741,088, filed Feb. 27, 2007, Kalipatnapu, et al., final Office Action dated Dec. 7, 2011, 6 pages.

The Third Office Action from The Patent Office of the People's Republic of China, Application No. 200780014147.4, 7 pages.

Communication pursuant to Article 94(3) EPC, Application No. 07 798 195.9-2221, 6 pages.

Request for Continued Examination for U.S. Appl. No. 11/796,993, Apr. 30, 2007, Shah, et al., 1 page.

Request for Continued Examination for U.S. Appl. No. 11/741,088, filed Feb. 27, 2007, Kalipnatnapu, et al., 1 page.

Response to USPTO Office Action for U.S. Appl. No. 11/796,993, 14 pages.

Response to USPTO Office Action for U.S. Appl. No. 11/741,088, 17 pages.

* cited by examiner

SYSTEM AND METHOD FOR OPTIMIZING MAINTENANCE OF GEOGRAPHICALLY DISTRIBUTED PROCESSING UNITS

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD OF THE INVENTION

This invention relates in general to data processing, and more particularly to a system and method for optimizing maintenance of geographically distributed processing units.

BACKGROUND OF THE INVENTION

Virtually every data processing system requires periodic maintenance, such as for back-up, synchronization, and upgrades. Since these maintenance operations may interfere significantly with applications and other user operations, system administrators have generally picked a maintenance time at which the administrator expected low system activity.

As commercial globalization trends continue to develop, however, some systems are becoming increasingly globalized. Selecting an optimal maintenance time for such systems has proven far more challenging than for traditional systems.

Accordingly, there is a need in the art for an improved system and method for optimizing the maintenance times for these systems.

SUMMARY OF THE INVENTION

In accordance with the present invention, the disadvantages and problems associated with maintaining geographically distributed data processing systems have been substantially reduced or eliminated.

In accordance with one embodiment of the present invention, a method is provided for optimizing maintenance of a geographically distributed data processing system. The method comprises selecting a primary territory having associated operating hours, identifying maintenance hours that exclude the operating hours, and selecting a maintenance time substantially corresponding to a midpoint of the maintenance hours.

In accordance with another embodiment of the present invention, a system is provided for optimizing maintenance of geographically distributed endpoints. The system comprises a processor, a memory coupled to the processor, and a program stored in the memory comprising an algorithm for controlling the processor. The algorithm comprises selecting a primary territory having associated operating hours, identifying maintenance hours that exclude the operating hours, and selecting a maintenance time substantially corresponding to a midpoint of the maintenance hours.

Important technical advantages of certain embodiments of the invention include reducing interference of maintenance activities on operational activities in a geographically distributed data processing system. Applying certain principles of the invention, maintenance activities may be limited to certain hours by selecting a maintenance time that is less likely to interfere with operations in a designated territory.

Another important technical advantage of certain embodiments of the invention includes the ability to optimize maintenance times based on executive or business considerations, rather than ad hoc administrator selection. Business considerations such as the location of executive operations or critical customers may be factored into the selection of an optimal maintenance time, rather than just the local operation hours of a system administrator.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Certain embodiments of the invention are described below with reference to an exemplary network of functional elements. Each such functional element may represent a hardware device, software, process, or any combination thereof. A "network" comprises any number of these functional elements coupled to and in communication with each other through a communications medium. A "communications medium" includes without limitation any conductive, optical, electromagnetic, or other medium through which a functional element can transmit data. Unless otherwise indicated in context below, all network nodes may use publicly available protocols or messaging services to exchange signals, messages, and other forms of electronic communication with each other through a network.

Software and data structures associated with certain aspects of the invention typically are stored in a memory, which may be coupled to a functional element directly or remotely through a network. The term "memory," as used herein, includes without limitation any volatile or persistent medium, such as an electrical circuit, magnetic disk, or optical disk, in which a data or software may be stored for any duration. A single memory may encompass and be distributed across a plurality of media.

The present invention contemplates operation in an environment of any data processing system having endpoints or components geographically distributed across multiple time zones and, perhaps, multiple continents. At least one embodiment contemplates operation in a video conferencing system having globally distributed elements. Certain embodiments, though, are intended to operate in conjunction with conferencing elements designed to provide an experience that simulates a face-to-face conference. For instance, such elements may comprise one or more high-definition screens of sufficient dimensions to display life-size images of conference participants, while audio components provide high-definition surround sound. Such an experience is referred to herein as a "telepresence" conference to convey the concept of a conferencing system that surpasses the quality and experience of conventional video conferencing experiences.

Figure 1:
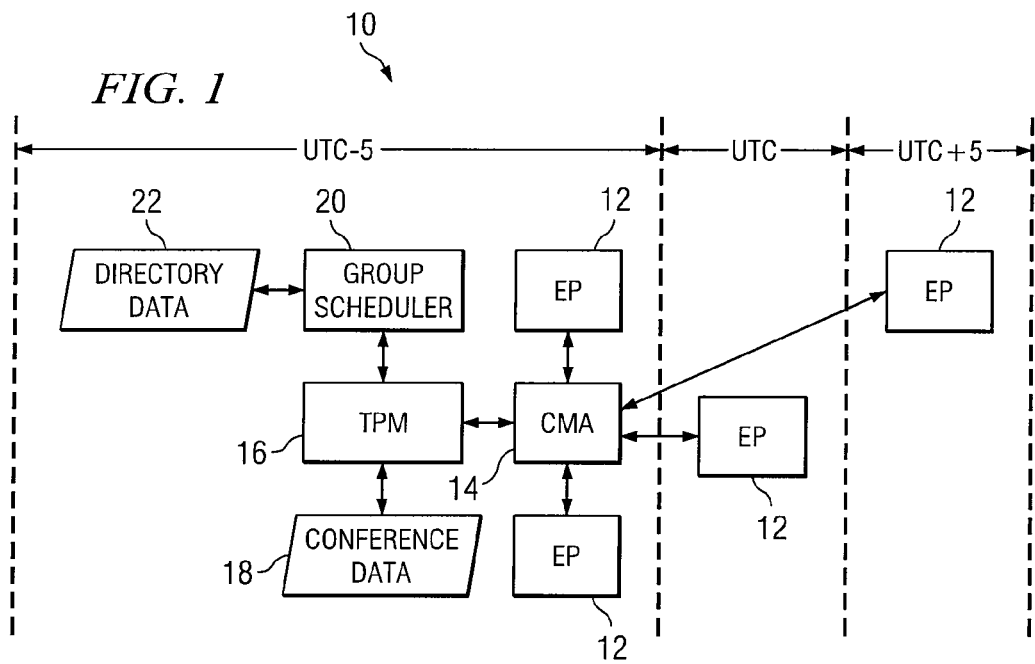
FIG. 1 is a simplified block diagram of an example conferencing network environment in which the present invention may operate.

FIG. 1 is a simplified block diagram of an example conferencing network 10 in which the present invention may operate. Network 10 comprises endpoints 12 managed by a call management agent (CMA) 14. A telepresence manager (TPM) 16 also is coupled to call management agent 14. Conference data 18 is stored in a memory coupled to TPM 16. Group scheduler 20 and associated directory data 22 are coupled to TPM 16 through network 10.

FIG. 1 further illustrates the elements of network 10 distributed across three time zones. FIG. 1 illustrates these time zones in Coordinated Universal Time (UTC) as UTC−5, UTC, and UTC+5, but standard local times may be substituted. UTC generally represents the standard local times of Greenwich Mean Time (or Western European Time). UTC−5 generally represents Eastern Standard Time. UTC+5:30 generally represents Indian Standard Time, but has been abbreviated as UTC+5 for purposes of this description. These time zones are illustrative only, and are not intended to limit the scope of the invention to application in any particular time zone or time system.

For purposes of description, it is presumed that TPM 16 requires periodic maintenance to synchronize conference data 18 with directory data 22, to push conference data to endpoints 12, to perform backups, and the like. Because endpoints 12 are distributed across multiple time zones, some endpoint 12 in network 10 may be active at any given time and it may be difficult or impossible to identify a time during which all endpoints are inactive.

Figure 2:
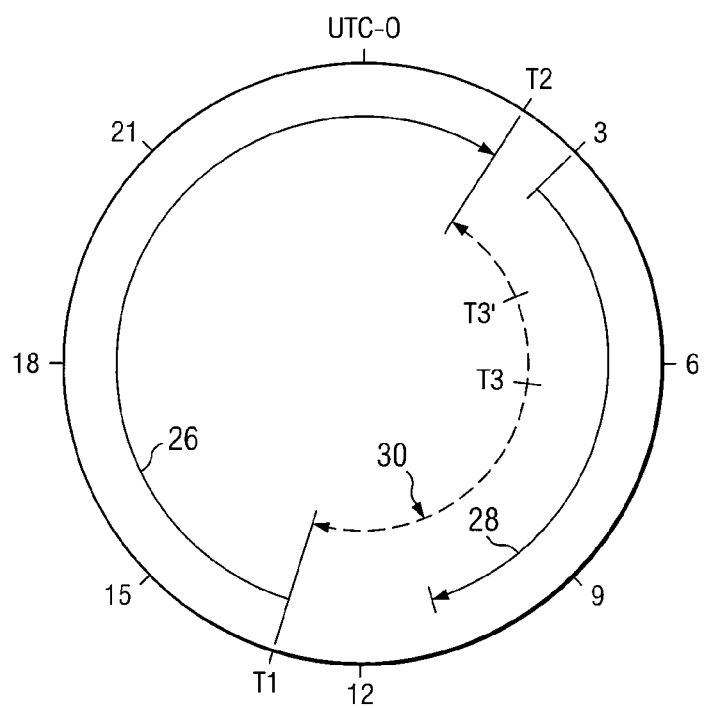
FIG. 2 is a diagram that illustrates activity of example endpoints on a twenty-four hour UTC clock.

FIG. 2 is a diagram that illustrates activity of example endpoints on a twenty-four hour UTC clock. The top of the circle corresponds to UTC 0:00. Each clockwise tick-mark represents a three hour increment. To illustrate the problems associated with maintaining a globally distributed data processing system, FIG. 2 presumes that particular geographic territories observe standard business operating hours of 08:00 to 17:00 local standard time. In North America, these operating hours correspond to 13:00 UTC (T1) to 02:00 UTC (T2). These hours are marked as operating hours 26 in FIG. 2. In India, these operating hours correspond to 03:00 UTC to 11:00 UTC, which are marked as operating hours 28 in FIG. 2. Thus, as evident from FIG. 2, there is very little time remaining to be allocated to maintenance hours. More particularly, the only time not allocated to operating hours is one hour between 02:00 and 03:00 UTC, and two hours between 11:00 and 13:00 UTC. To complicate matters further, however, it is often undesirable to schedule maintenance during these hours because these hours are frequently used for communicating between the territories. Clearly, in such a scenario, careful planning and consideration is required to optimize maintenance time so that the impact on operations is minimized.

Figure 3:
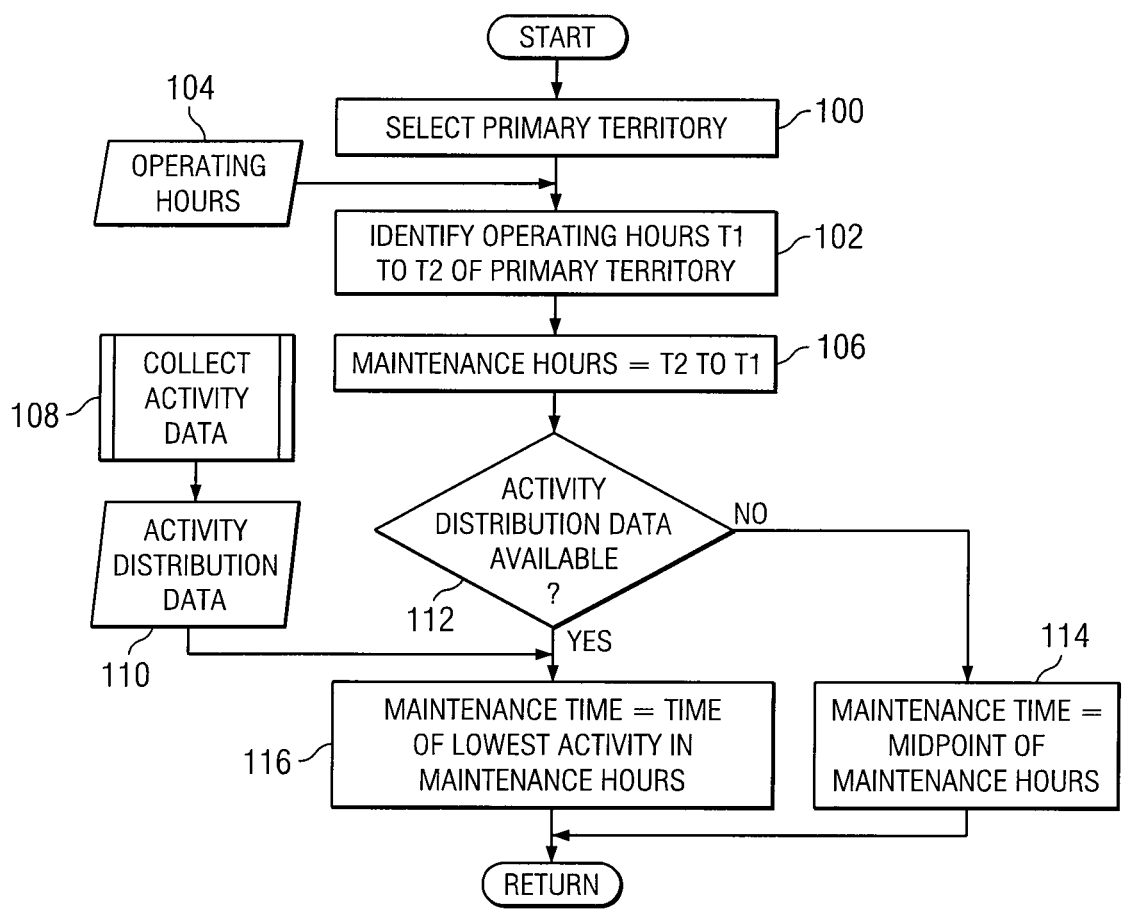
FIG. 3 is a flow diagram that illustrates one algorithm for optimizing the maintenance time for a geographically distributed data processing system.

FIG. 3 is a flow diagram that illustrates one algorithm for optimizing the maintenance time for a geographically distributed data processing system, such as that illustrated in FIG. 1. The algorithm of FIG. 3 may be implemented on any suitable computer or data processing system. Such an algorithm may be executed once during the initial configuration and setup of a system, or may be executed interactively or as a background process during operation to dynamically select an optimal maintenance time.

In step 100, a "primary" territory is selected. A primary territory represents any geographic territory (and associated time zones) that takes precedence over other territories for purposes of scheduling maintenance. A territory may represent specific political or business subdivisions, a collection of particular time zones, or any other suitable boundary between geographically distributed elements.

A primary territory may be selected using several alternative algorithms and criteria, or may be manually selected by an administrator. In one embodiment, for example, a data processing system may store data that represents the geographic distribution of endpoints associated with the system. In such an embodiment, the algorithm of FIG. 3 may include steps for analyzing the geographic distribution to identify a territory having the largest concentration of endpoints. Well-known searching, sorting, and statistic algorithms may be applied to geographic distribution data to identify the largest endpoint concentration. Alternatively, the algorithm may include steps for analyzing activity distribution data 110, if available, to identify the most active territory. Again, such an algorithm may incorporate well-known searching, sorting, and statistic algorithms to analyze activity distribution data 110. In yet another embodiment, territories may be associated with one or more business units and a primary territory may be selected based on the location of a business unit for executive operations.

In step 102, operating hours 104 (beginning at time T1 and ending at time T2) of the primary territory are identified or selected. In such an embodiment, operating hours 104 for each territory may be stored in a memory and subsequently retrieved in step 102, or the operating hours may be entered manually. For example, if North America is designated as a primary territory, then standard operating hours associated with North America may be retrieved from a memory or entered manually. Moreover, in alternate embodiments step 100 may be omitted and primary operating hours may be selected without regard to geographic territories in step 102. For example, primary operating hours may be designated as 15:00 to 21:00 UTC.

In step 106, potential maintenance hours are determined. In the embodiment illustrated in FIG. 3, the maintenance hours include all hours except the primary operating hours. Thus, referring again to FIG. 2 for illustration, potential maintenance hours would include the hours marked as maintenance hours 30 if North America is selected as the primary territory.

Historical activity data may be collected from logs and other sources in step 108, and stored as activity distribution data 110. Collecting activity data in step 108 is independent of the general algorithm described in FIG. 3, and generally operates in parallel with this algorithm rather than in series.

Steps 112-116 illustrate selecting a maintenance time from the maintenance hours determined in the previous steps. These steps select a maintenance time that minimizes interference with operating activities in various configurations of a geographically distributed system.

In step 112, it is determined if activity distribution data 110 has been collected. If activity distribution data 110 has not been collected or is otherwise unavailable, then the midpoint of the maintenance hours is selected as the optimal maintenance time (step 114). Referring again to the example wherein North America is selected as the primary territory, maintenance hours include 02:00 to 13:00 UTC, and the midpoint T3 (06:50 UTC) would be selected as the optimal maintenance time if no activity distribution data is available.

If activity distribution data 110 has been collected and is available, then activity distribution data 110 is examined to identify the time of lowest activity during the potential maintenance hours (step 116). Well-known searching, sorting, and statistics algorithms may be applied to activity distribution data to identify or predict the time having the lowest activity. Alternatively, if a data processing system includes scheduling data, such as for a video conference system, the scheduling data may be analyzed instead of or in addition to activity distribution data 110 to predict the time of lowest activity. The time having the lowest activity is selected as the optimal maintenance time. By way of example, such a time is marked in FIG. 2 as T3'.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

The principles of the invention may be implemented in a variety of hardware and software configurations. As is commonly understood in the art, the structure for implementing the functions described above may comprise any appropriately configured data processing hardware, software, process, algorithm, or combination thereof. Moreover, algorithms described above may be coupled to one or more user interfaces to enable an operator, user, or administrator to interact with the algorithms to any extent necessary to carry out the principles of the invention, including without limitation, configuring the algorithms, entering data interactively, and controlling decision blocks.

What is claimed is:

1. A geographically distributed processing system comprising:
   a plurality of endpoints distributed across a plurality of territories;
   a call management agent coupled to the endpoints;
   a telepresence manager coupled to the call management agent; and
   a memory having conference data;
   wherein the telepresence manager is operable to:
      select a primary territory having associated operating hours;
      identify maintenance hours that exclude the operating hours;
      if no data associated with the data processing system is available, select a first maintenance time substantially corresponding to a midpoint of the maintenance hours;
      if data associated with the data processing system is available:
         analyze data associated with the data processing system to identify a time of lowest activity within the maintenance hours; and
         select a second maintenance time corresponding to the time of lowest activity; and
      initiate maintenance at the maintenance time, wherein the maintenance comprises pushing conference data to one or more of the endpoints.

2. A method for optimizing maintenance of a geographically distributed dataprocessing system, the method comprising:
   selecting, by a telepresence manager, a primary territory having associated operating hours;
   identifying, by the telepresence manager, maintenance hours that exclude the operating hours;
   if no data associated with the data processing system is available, selecting, by the telepresence manager, a maintenance time substantially corresponding to a midpoint of the maintenance hours; and
   if data associated with the data processing system is available:
      analyzing, by the telepresence manager, data associated with the data processing system to identify a time of lowest activity within the maintenance hours; and
      selecting, by the telepresence manager, a maintenance time corresponding to the time of lowest activity.

3. The method of claim 2, wherein data associated with the data processing system comprises activity distribution data and/or scheduling data.

4. The method of claim 2, wherein selecting the primary territory comprises:
   analyzing, by the telepresence manager, data representing a geographic distribution of endpoints associated with the data processing system; and
   selecting, by the telepresence manager, a territory having the largest concentration of endpoints as the primary territory.

5. The method of claim 2, wherein selecting the primary territory comprises:
   analyzing, by the telepresence manager, activity distribution data associated with the data processing system; and
   selecting, by the telepresence manager, a territory having the most activity as the primary territory.

6. The method of claim 2, wherein the primary territory is a territory associated with executive operations.

7. A system for optimizing maintenance of geographically distributed endpoints, the system comprising:
   a processor;
   a memory coupled to the processor; and
   a program stored in the memory comprising an algorithm for controlling the processor, the algorithm comprising:
      selecting a primary territory having associated operating hours;
      identifying maintenance hours that exclude the operating hours;
      if no data associated with the data processing system is available, selecting a maintenance time substantially corresponding to a midpoint of the maintenance hours; and
      if data associated with the data processing system is available:
         analyzing data associated with the data processing system to identify a time of lowest activity within the maintenance hours; and
         selecting the maintenance time to correspond to the time of lowest activity.

8. The system of claim 7, wherein data associated with the data processing system comprises activity distribution data and/or scheduling data
   selecting the maintenance time to correspond to the time of lowest activity.

9. The system of claim 7, wherein the algorithm for selecting the primary territory comprises:
   analyzing data representing a geographic distribution of the endpoints; and
   selecting a territory having the largest concentration of endpoints as the primary territory.

10. The system of claim 7, wherein the algorithm for selecting the primary territory comprises:
    analyzing activity distribution data associated with the data processing system; and
    selecting a territory having the most activity as the primary territory.

11. The system of claim 7, wherein the primary territory is a territory associated with executive operations.

12. Software for optimizing maintenance of a geographically distributed data processing system, the software being embodied in a non-transitory computer-readable memory comprising computer code such that when executed is operable to:

select a primary territory having associated operating hours;
identify maintenance hours that exclude the operating hours; and
if no data associated with the data processing system is available, select a maintenance time substantially corresponding to a midpoint of the maintenance hours; and
if data associated with the data processing system is available:
analyze data associated with the data processing system to identify a time of lowest activity within the maintenance hours; and
select the maintenance time to correspond to the time of lowest activity.

13. The software of claim 12, wherein data associated with the data processing system comprises activity distribution data and/or scheduling data.

14. The software of claim 12, wherein the computer code operable to select the primary territory comprises code operable to:
analyze data representing a geographic distribution of endpoints associated with the data processing system; and
select a territory having the largest concentration of endpoints as the primary territory.

15. The software of claim 12, wherein the computer code operable to select the primary territory comprises code operable to:
analyze activity distribution data associated with the data processing system; and
select a territory having the most activity as the primary territory.

16. The software of claim 12, wherein the primary territory is a territory associated with executive operations.

17. A system for optimizing maintenance of a geographically distributed data processing system, the system comprising:
means for selecting a primary territory having associated operating hours;
means for identifying maintenance hours that exclude the operating hours;
means for selecting, if no data associated with the data processing system is available, a maintenance time substantially corresponding to a midpoint of the maintenance hours;
means for analyzing, if data associated with the system is available, data associated with the data processing system to identify a time of lowest activity within the maintenance hour; and
means for selecting, if data associated with the system is available, the maintenance time to correspond to the time of lowest activity.

* * * * *